Nov. 20, 1962    J. C. BITTMAN    3,064,912
CONTINUOUS DUAL TAKE-UP DEVICE
Filed Jan. 8, 1960    12 Sheets-Sheet 1

INVENTOR.
JESS C. BITTMAN
BY
Oberlin, Maky & Donnelly
ATTORNEYS

INVENTOR.
JESS C. BITTMAN
BY
Oberlin, Maky & Donnelly
ATTORNEYS

Nov. 20, 1962  J. C. BITTMAN  3,064,912
CONTINUOUS DUAL TAKE-UP DEVICE
Filed Jan. 8, 1960  12 Sheets-Sheet 4

INVENTOR.
JESS C.
BITTMAN
BY
Oberlin, Maky & Donnelly
ATTORNEYS

Nov. 20, 1962  J. C. BITTMAN  3,064,912
CONTINUOUS DUAL TAKE-UP DEVICE
Filed Jan. 8, 1960  12 Sheets-Sheet 5

INVENTOR.
JESS C. BITTMAN
BY
Oberlin, Maky & Donnelly
ATTORNEYS

Nov. 20, 1962 J. C. BITTMAN 3,064,912
CONTINUOUS DUAL TAKE-UP DEVICE
Filed Jan. 8, 1960 12 Sheets-Sheet 6

*INVENTOR.*
JESS C. BITTMAN
BY
Oberlin, Maky & Donnelly
ATTORNEYS

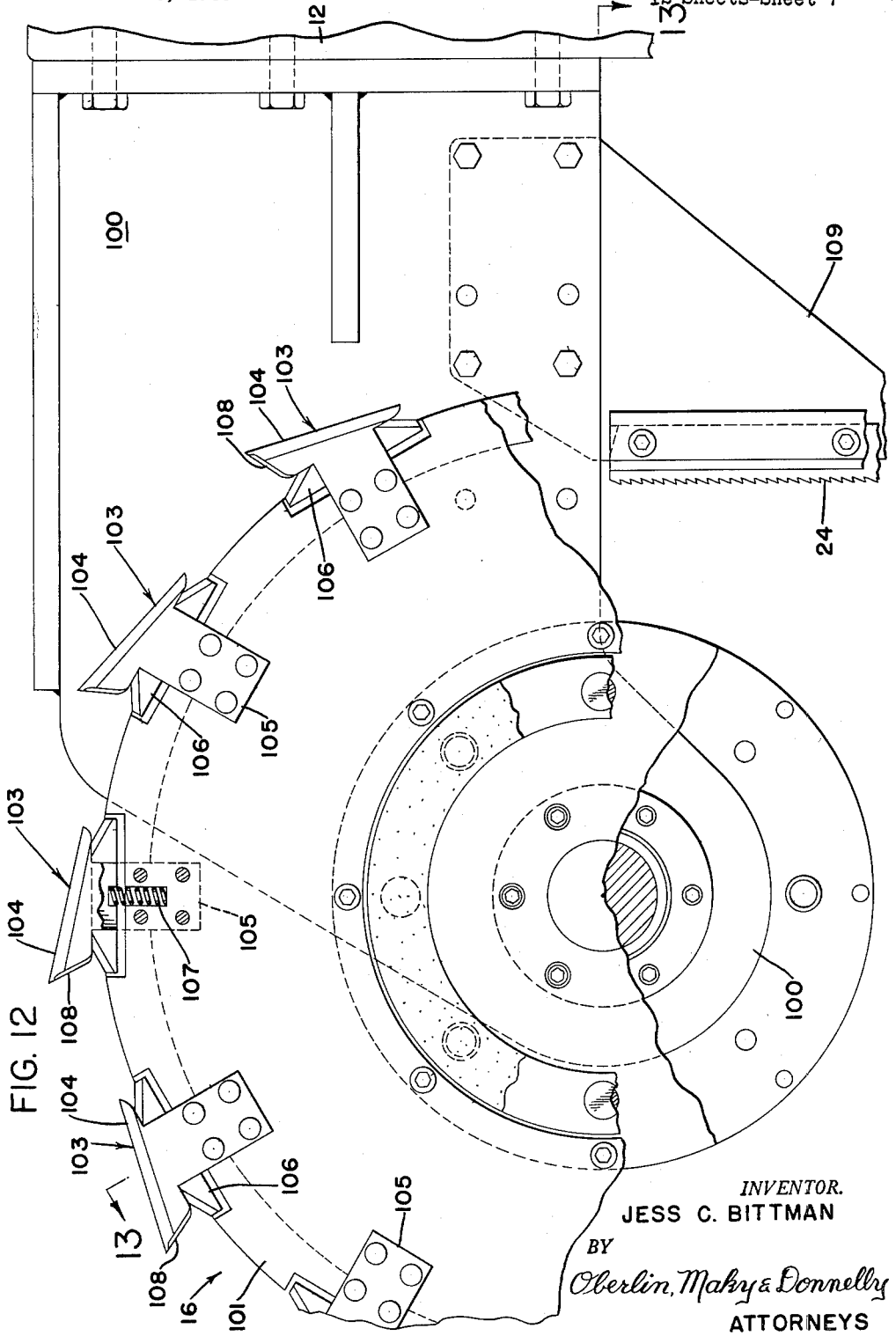

Nov. 20, 1962    J. C. BITTMAN    3,064,912
CONTINUOUS DUAL TAKE-UP DEVICE
Filed Jan. 8, 1960    12 Sheets-Sheet 8

INVENTOR.
JESS C. BITTMAN
BY
Oberlin, Maky & Donnelly
ATTORNEYS

INVENTOR.
JESS C. BITTMAN
BY
Oberlin, Maky & Donnelly
ATTORNEYS

INVENTOR.
JESS C. BITTMAN
BY
Oberlin, Maky & Donnelly
ATTORNEYS

Nov. 20, 1962 J. C. BITTMAN 3,064,912
CONTINUOUS DUAL TAKE-UP DEVICE
Filed Jan. 8, 1960 12 Sheets-Sheet 11

INVENTOR.
JESS C. BITTMAN
BY
Oberlin, Maky & Donnelly
ATTORNEYS

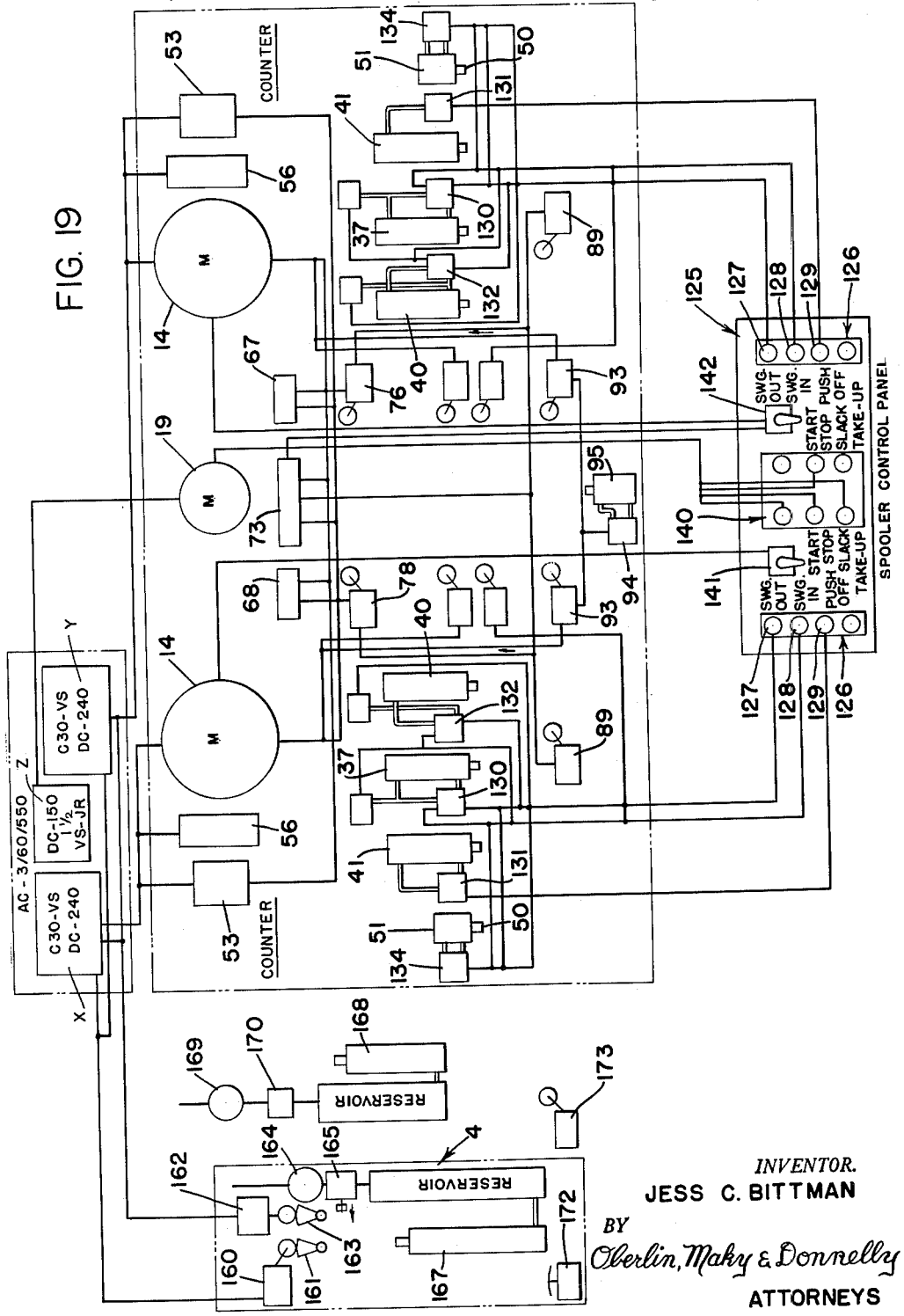

United States Patent Office 3,064,912
Patented Nov. 20, 1962

3,064,912
CONTINUOUS DUAL TAKE-UP DEVICE
Jess C. Bittman, Cuyahoga Falls, Ohio, assignor to The Vaughn Machinery Company, Cuyahoga Falls, Ohio, a corporation of Ohio
Filed Jan. 8, 1960, Ser. No. 1,367
21 Claims. (Cl. 242—25)

The present invention relates generally as indicated to a continuous dual take-up device, and more particularly, to a high speed dual take-up device wherein a reciprocable fleeter or traverse mechanism winds wire or the like on one of two coaxial spools, and then shifts from the full spool similarly to wind the wire onto the other spool whereby the winding operation may be performed continuously, the spool arbors being movably mounted so that the one having the full spool thereon may be shifted to inactive position for removal of the full spool and for reloading with an empty spool during the time that wire is being wound on the spool of the other arbor.

Hitherto, with increasing lineal speeds of wire processing considerable difficulty has been encountered during the cut-over of the wire from the full spool to the empty spool and, of course, if both spools are driven at the same speed there is created a serious acceleration problem. Moreover, the greater the difference between the spool barrel and full wind diameters, the greater the acceleration problem. Also, high spool speeds have necessitated the use of precision, balanced spools, especially in cases where the spool arbors are of the cantilever type having lateral support at their outer ends only, the weights of the spools and wire wound thereon being supported on the free juxtaposed ends of the respective arbors.

The Cook Pat. No. 2,424,021, dated July 15, 1947 discloses a spooler of the character indicated above wherein the coaxial spool arbors are of the cantilever type. Moreover, it is noted that in the Cook spooler, the unloading and reloading of the arbors entails not only lateral movements of the arbors but of their drive motors and drive gearing, as well. In addition, the Cook spooler requires that the inside flanges of the two coaxial spools be quite close together and that the fleeter have differential speeds of traverse so that, at the time that cutover is effected from the full spool to the empty one, the wire will cross over without tangling or snarling between such inside flanges. Aside from the foregoing, the Cook spooler requires that the fleeter be provided with means to move the fleeter through fast lead, short strokes other than the usual winding strokes in order to bind the starting end of the wire coils on an empty spool and to provide a progressively growing cutover loop which eventually moves in the path of a wire cutter, and that the spooler be provided with wire-engaging belts to hold the finishing end of the cut wire on a full spool.

With the foregoing in mind, it is a principal object of this invention to provide a very simple and efficient dual take-up device or spooler which has one or more of the following features that are enumerated below without regard to their relative importance:

(1) The provision of a fleeter or traverse that has a simple form of variable speed drive that traverses one spool to wind wire thereon and then traverses the other spool when said one spool is full;

(2) The provision of spool arbors and housings therefor which are supported for movement between active and inactive positions, i.e. winding and unload-reload positions, independently of the drive motors and drive gearing therefor;

(3) The provision of rotary spool engaging members which assist in supporting the spools on the free ends of the rotary cantilever type arbors to eliminate whipping action;

(4) The provision of a wire snagger and cutter between coaxial spool arbors effective to grab or snag the finishing end of the wire from the full spool, to grab or snag the starting end of the wire for winding on the empty spool, and to cut the wire between the snagged portions for commencement of the winding operation of the empty spool and to release the full spool for stopping and subsequent withdrawal from the snagger;

(5) The provision of a cutover mechanism effective to continue the winding operation of the full spool as the fleeter shifts from winding position relative thereto to winding position relative to the empty spool, and to cause the wire to snap across from the full spool to the empty spool for prompt snagging and cutting by the aforesaid snagger located between the spools;

(6) The provision of arbor drive means characterized in that the full spool and the empty speed spool are, at the time of cutover, driven at substantially equal rim speeds, and thereafter the empty spool is accelerated to running speed while the slack wire is taken up by a festoon unit disposed ahead of the take-up device, whereby the aforesaid acceleration problem is not encountered;

(7) The provision of independently rotatably supported snagger discs that are provided with wire snagger fingers around their peripheries and that are arranged to be driven by the respective spool arbors at proper speeds, the number and angular spacing of the fingers on the respective discs being such that within a fraction of one revolution the finishing end of the wire from the full spool and the starting end of the wire to be wound on the empty spool is snagged and cut therebetween; and (8) The provision of an automatic control system whereby sequential actuation of the fleeter, the cutover mechanism, the arbors, and other components of the dual takeup device herein is effected responsive to accumulation of a predetermined number of turns of wire on the spool being wound.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 2:
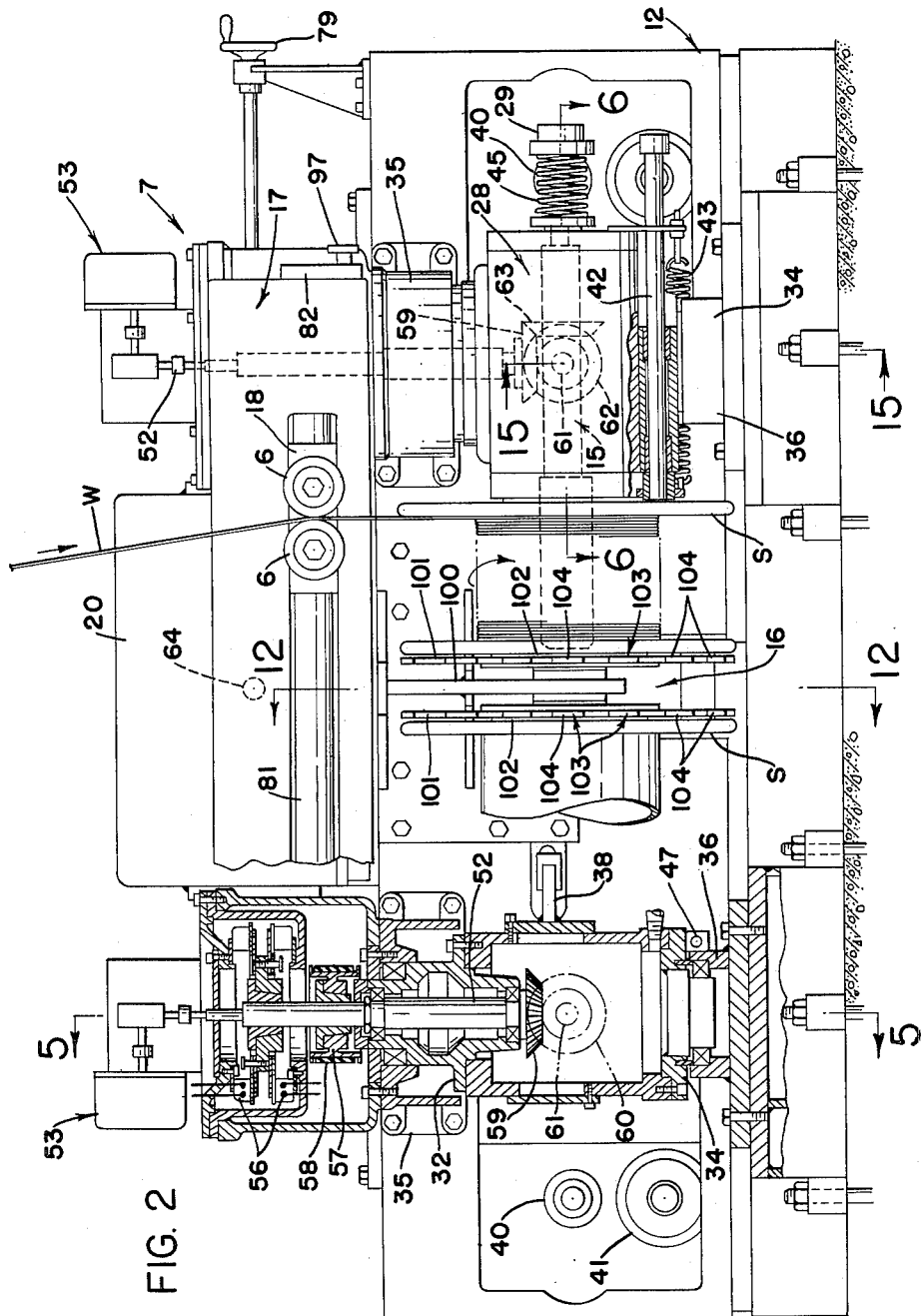
FIG. 2 is an enlarged front elevation view, partly in section, showing a preferred form of continuous dual take-up device incorporating the improvements of the present invention.
Figure 3:
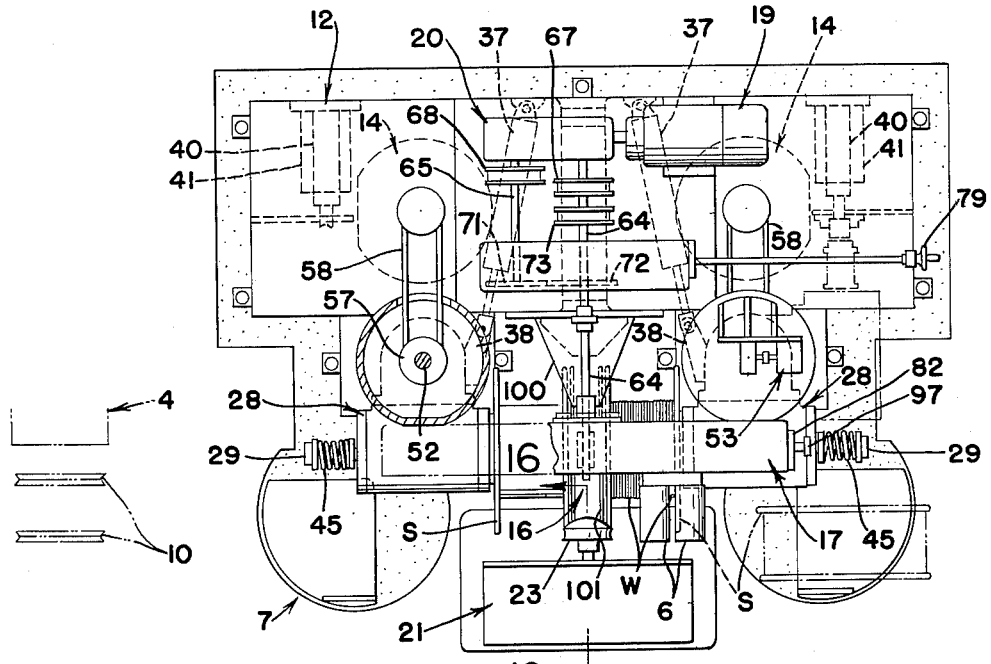
FIG. 3 is a top plan view of the dual takeup device shown in FIG. 2.
Figure 7:
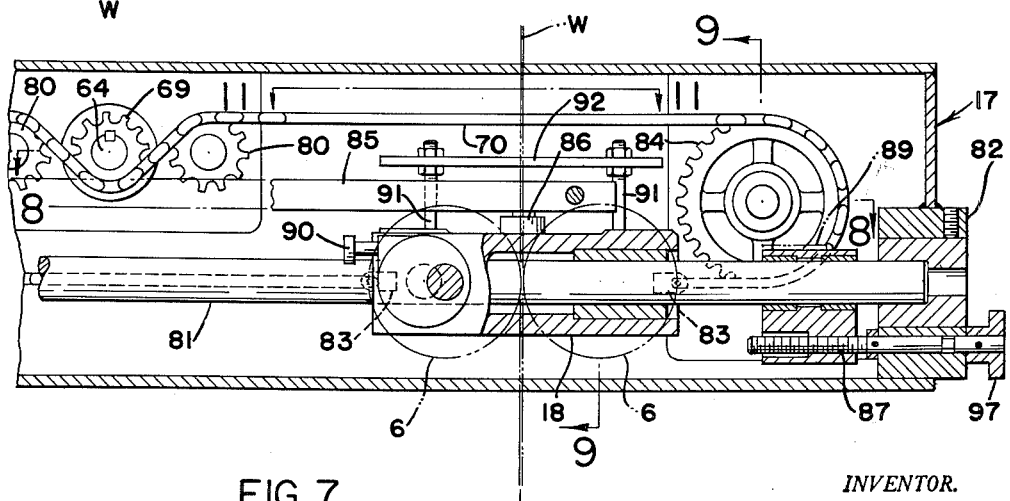
FIG. 7 is a fragmentary horizontal cross-section view of the wire fleeter as taken substantially along the line 7—7, FIG. 2.
Figure 8:
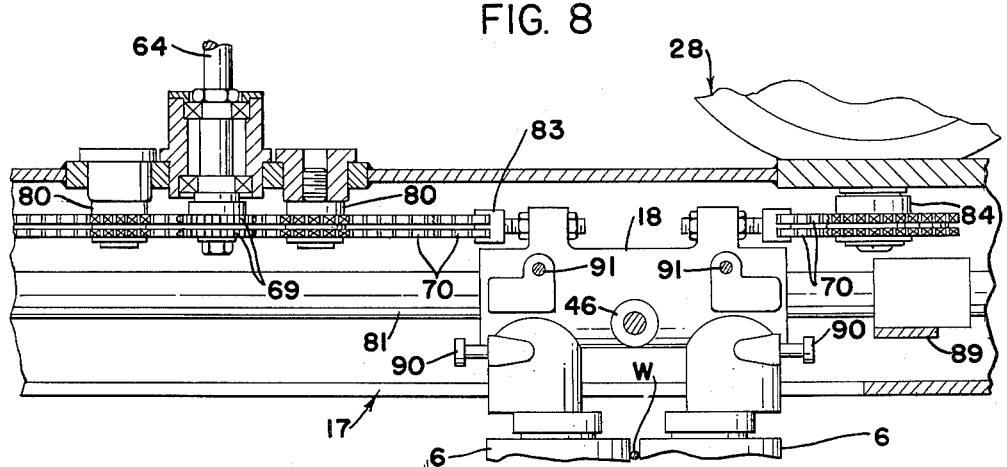
Figure 9:
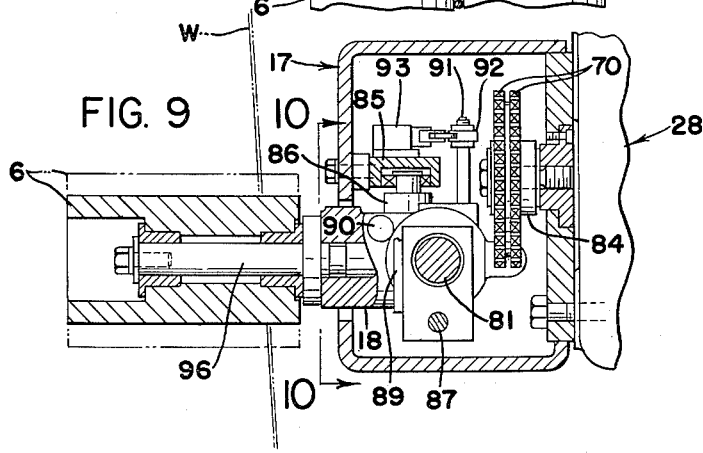
Figure 11:
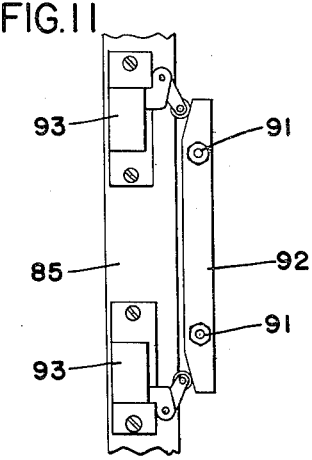
Figure 10:
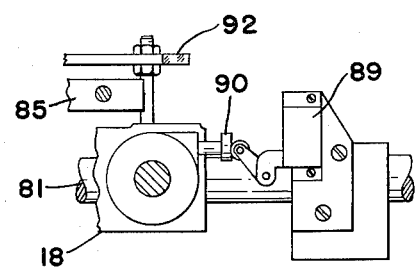
Figure 13:
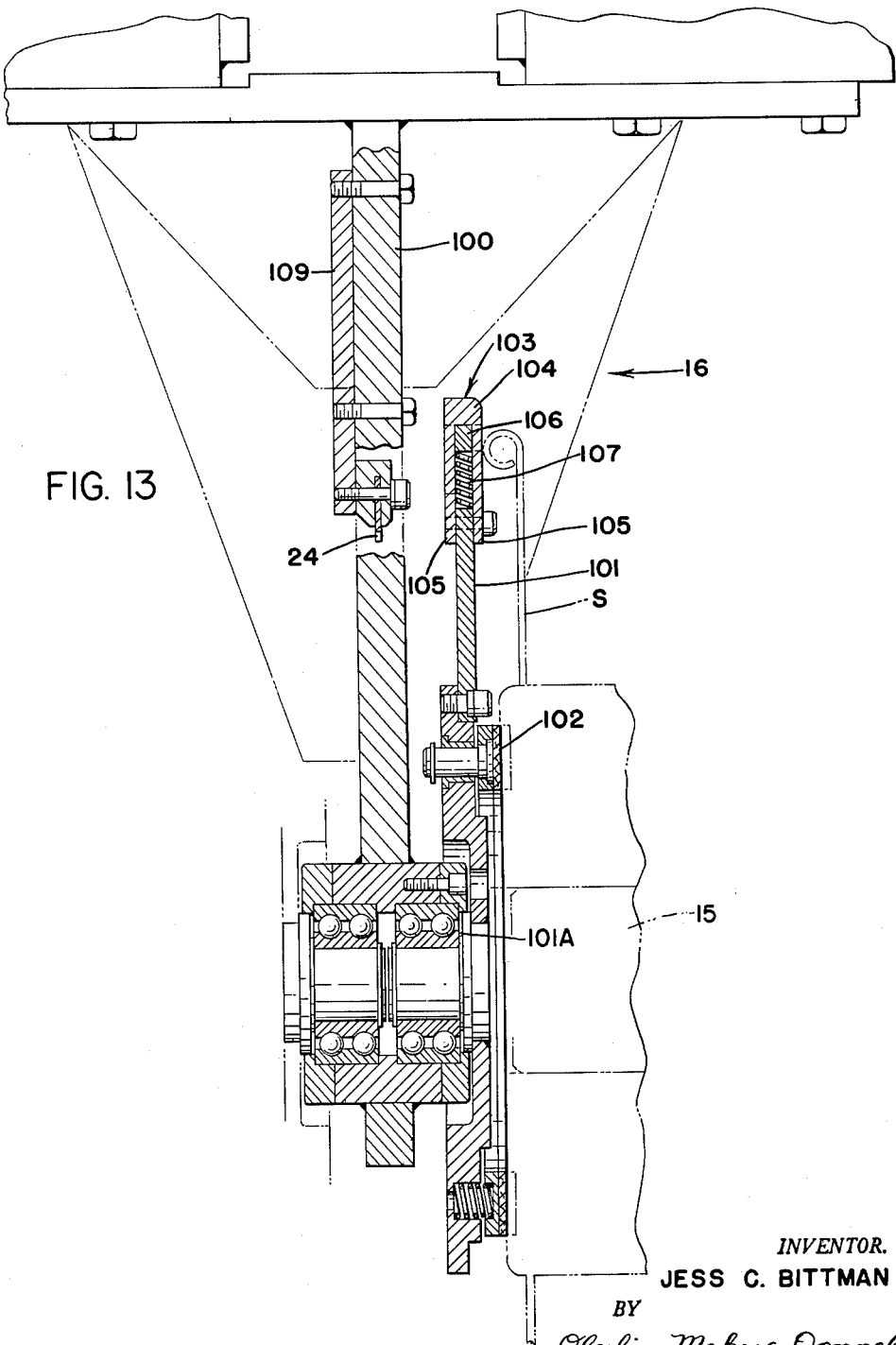
Figure 15:
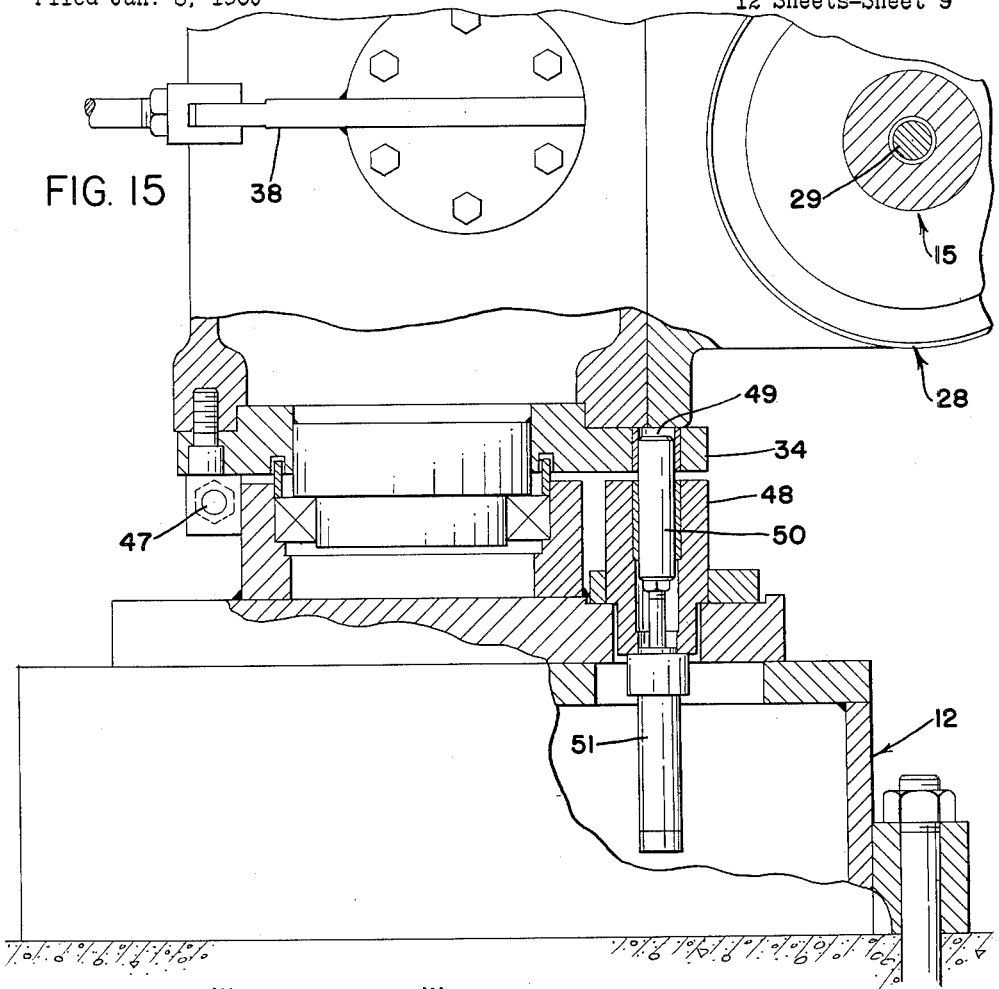
Figure 18:
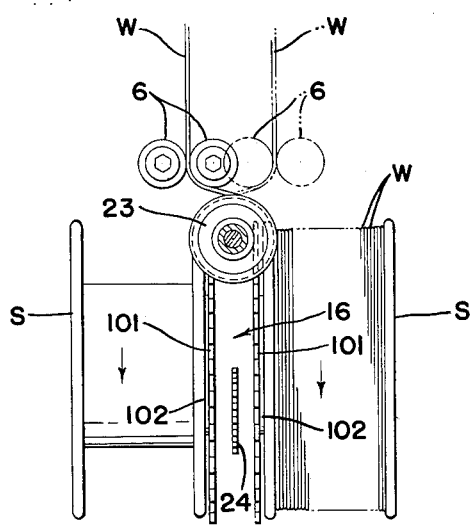
Figure 16:
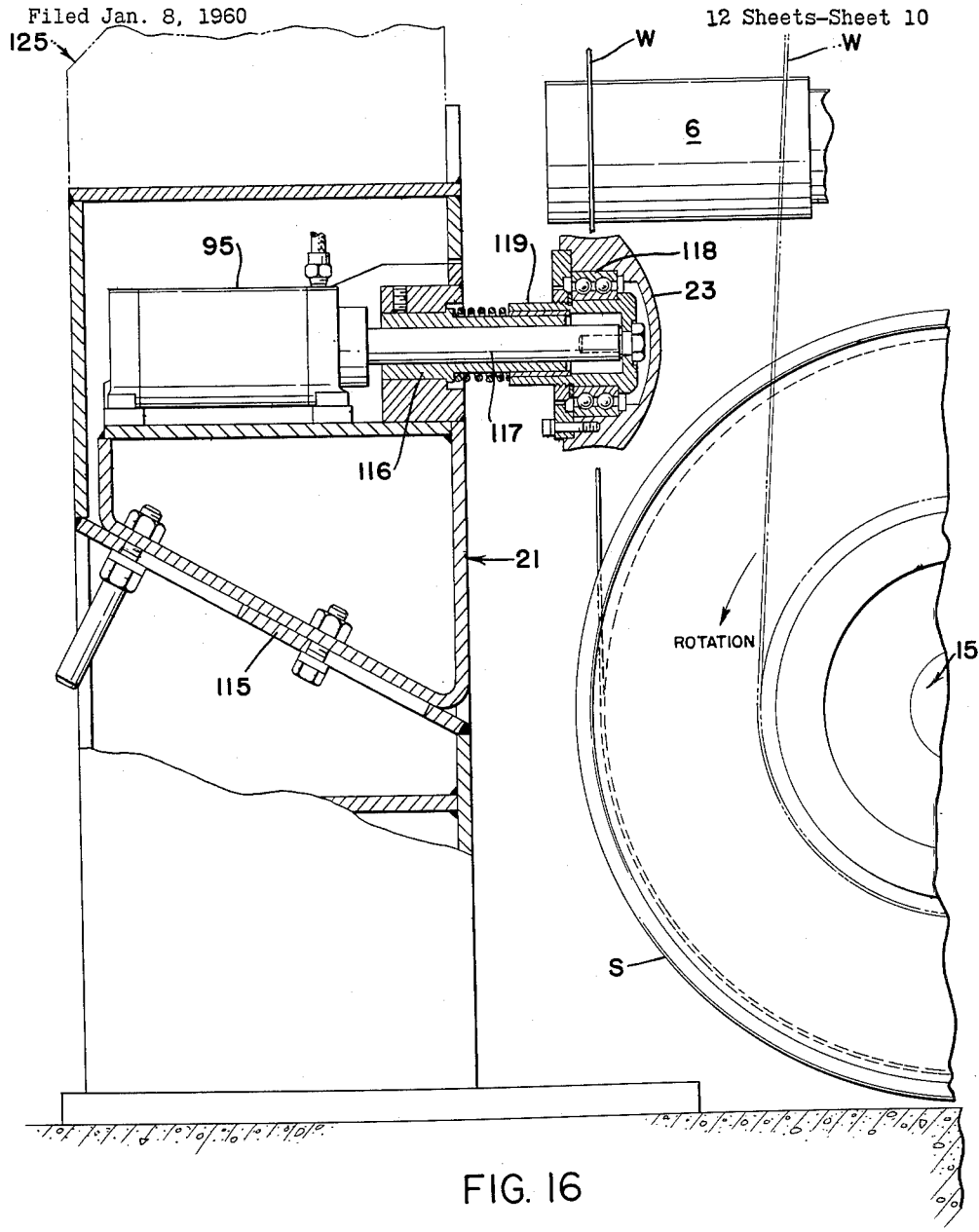
Figure 17:
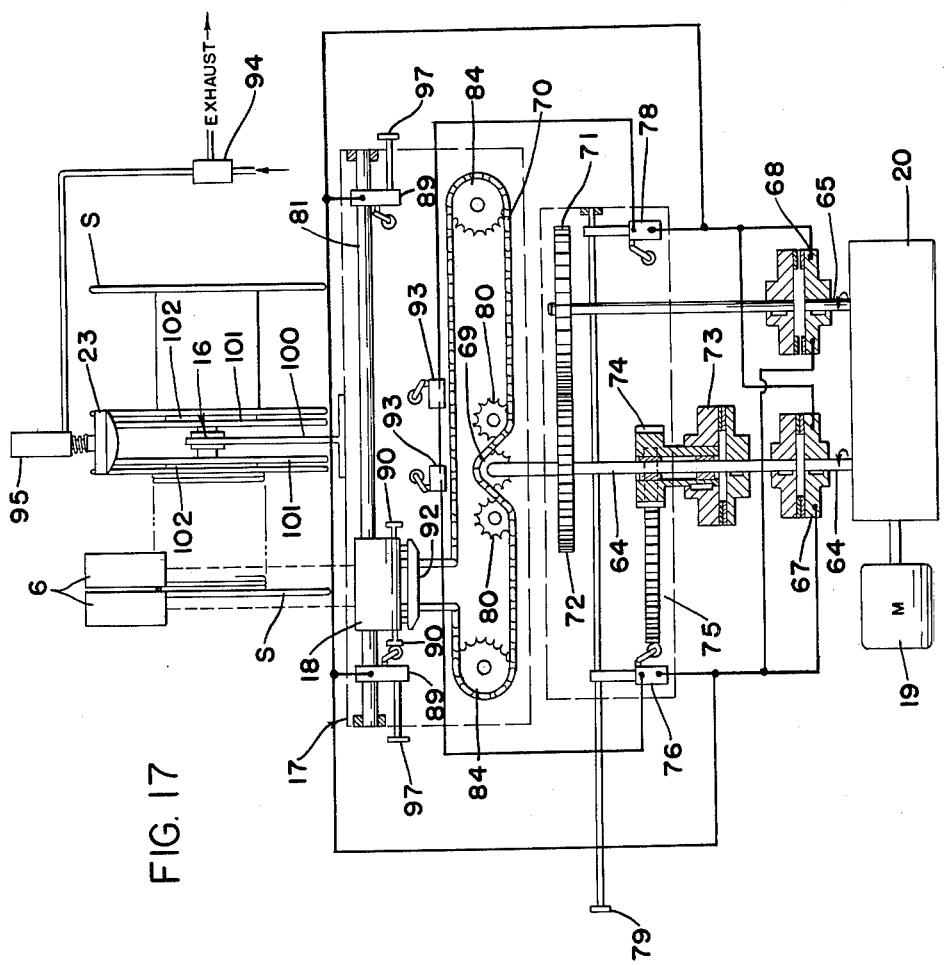

FIGS. 8, 9, 10 and 11 are, respectively, fragmentary section views taken generally along the lines 8—8, FIG. 7; 9—9, FIG. 7; 10—10, FIG. 9; and 11—11, FIG. 7;

FIG. 12 is a fragmentary cross-section view showing the wire snagger, such section having been taken substantially along the line 12—12, FIG. 2, but on enlarged scale;

FIG. 13 is a cross-section view of the snagger taken generally along the line 13—13, FIG. 12;

FIG. 14 is a perspective view of the snagger and also showing a spool arbor in swung out unload-reload position;

FIG. 15 is a cross-section view taken substantially along the line 15—15, FIG. 2 on enlarged scale and showing the latch for releasably locking the associated spool arbor in its operating position and the adjustable stop screw for determining the swung out position of the arbor;

FIG. 16 is a cross-section view taken substantially along the line 16—16, FIG. 3, on enlarged scale showing the shift or cut-over roll which is operative when actuated to snap the wire from one spool to the other for engagement and cutting by the snagger disposed therebetween;

FIG. 17 is a schematic diagram showing the manner in which the fleeter is actuated, first to wind wire on one spool, then shifted axially to wind wire on the other spool, while in the interval of shifting a transfer or cutover roll is arranged to continue the winding operation on the full spool until the fleeter carriage is disposed in a position to wind the wire on an empty spool;

FIG. 18 is another schematic diagram showing the wire transfer arrangement; and

FIG. 19 is a schematic diagram showing the various switches, solenoid air valves, and controls associated with the continuous dual takeup device herein.

The construction and operation of the dual takeup device herein will now be described in detail under the following main headings:

I. *The Continuous Wire or Rod Line (FIG. 1)*
II. *The Dual Take-Up Device Generally (FIGS. 1 to 6 and 17 to 19)*
III. *The Arbor Assembly (FIGS. 1 to 6, and 15)*
IV. *The Fleeter or Traverse Assembly (FIGS. 1 to 4, and 7 to 11)*
V. *The Snagger Assembly (FIGS. 2 and 12 to 14)*
VI. *The Spool-to-Spool Shift or Cutover Mechanism (FIGS. 3, 4, and 16 to 18)*
VII. *Automatic Control System (FIGS. 17 to 19)*
VIII. *Operation (FIGS. 1 and 17 to 19)*

I. *The Continuous Wire or Rod Line (FIG. 1)*

Figure 1:
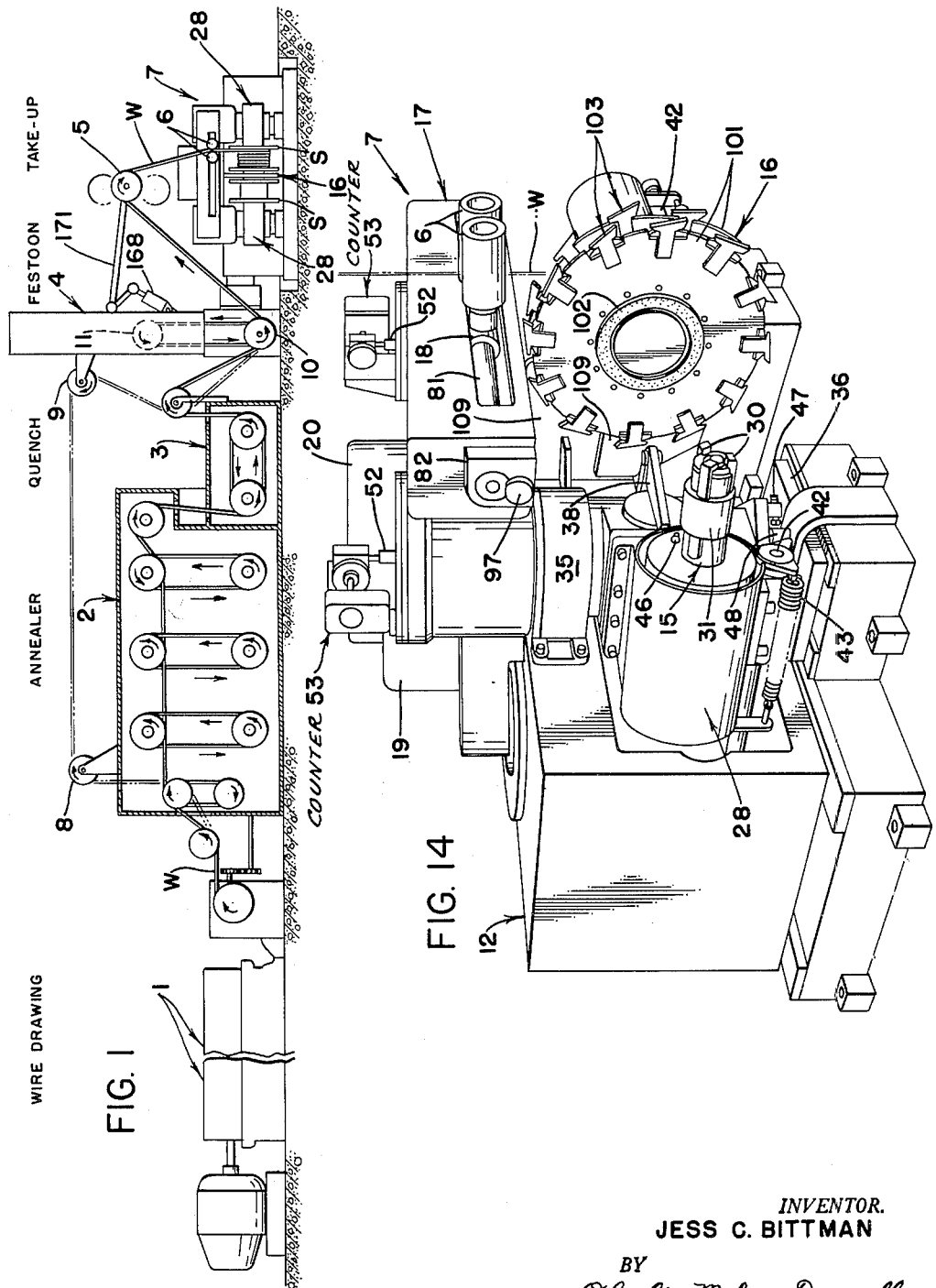
FIG. 1 is a diagrammatic front elevation view of a continuous wire or rod line including at the left a wire drawing machine and successively toward the right a continuous annealer, a quench tank, a festoon or accumulator unit and the dual takeup device herein.

In order that the present invention may be more readily comprehended there is shown in FIG. 1 a schematic arrangement wherein a wire drawing machine 1 is disposed at the left from which wire W travels over the successive rolls in a continuous annealer 2, in a quench tank 3, in a festoon or accumulator unit 4, and finally, over a dancer roll or sheave 5 and between the fleet rolls 6 of a dual take-up device 7. When the annealing operation is not required, the wire W taken off the drawing machine 1 may be passed over the guide rolls 8 and 9 as shown. The festoon or accumulator unit 4 is preferably of a type including relatively movable sheave gangs 10 and 11 around which the wire W is wrapped successively, and as the dancer roll 5 moves up or down, the reeling speed of the drive motor for the spool then being wound by the dual take-up device 7 is incrementally increased or decreased, as required, to maintain a predetermined tension and lineal speed in the wire and, of course, the festoon unit or accumulator 4, enables stoppage or slowing down of the wire W thereahead while the spooling operation continues.

II. *The Dual Take-Up Device Generally (FIGS. 1 to 6, and 17 to 19)*

The dual take-up device 7 briefly referred to in connection with the continuous line shown in FIG. 1, comprises a base 12 in which two electric drive motors 14 (see FIGS. 3 and 19) are mounted for driving the respective spool arbors 15 upon which spools S are held and positioned in coaxial relation on opposite sides of a snagger and wire cutter assembly 16.

Mounted on the top of the base 12 is the fleeter housing 17 on the reciprocable carriage 18 of which the fleet rolls 6 are mounted for passage of the wire W therebetween from the dancer roll 5 which also serves as a guide for the wire W as it passes thereover and between the fleet rolls 6 and is wound around one spool S as the carriage 18 is axially reciprocated between the flanges of that spool. The fleeter carriage 18 is driven by a separate variable speed drive motor 19 and a speed reducer-reversing mechanism 20 mounted on top of base 12 behind housing 17 as shown in FIG. 14 (see FIG. 17).

Figure 4:
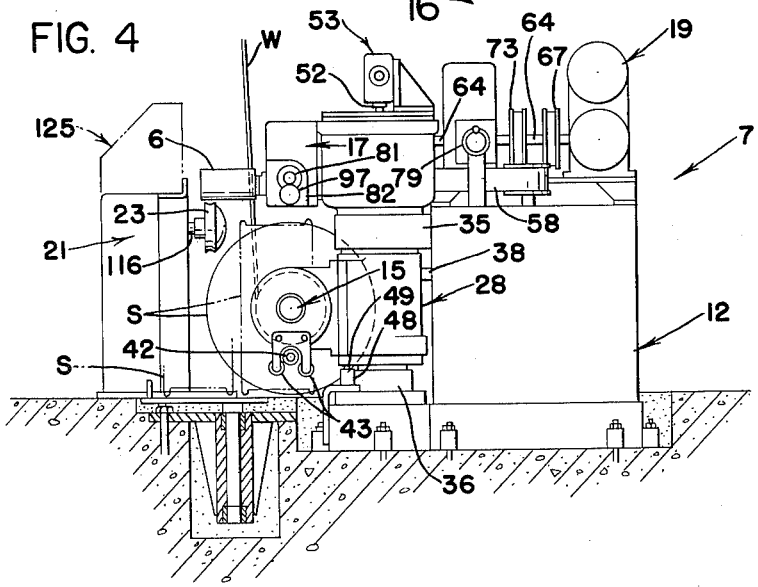
FIG. 4 is an end elevation view as viewed from the right-hand end of FIG. 2.

As best shown in FIGS. 3, 4, and 16, there is mounted in front of the arbors 15 and snagger assembly 16 a housing 21 which adjustably and movably supports a rotary shift or cut-over roll 23 which, as explained hereinafter, is effective to snap the wire W from a full spool S to an empty spool S across the snagger 16, the latter being effective to grasp the finishing and starting ends of the wire W and to cut the wire W therebetween.

Briefly outlined, the dual take-up device 7 herein operates as follows: Referring for example, to FIG. 1 as the right-hand spool S rotates it drives a snagger disc (not shown in FIG. 1) engaged thereby and the wire W will be wound on the right-hand spool as the fleet rolls 6 move axially back and forth between the flanges of that spool. When a predetermined number of turns of wire W have been wound onto the right-hand spool S, a counter mechanism as hereinafter described is effective to energize the drive motor for the left-hand spool S to drive it, and a snagger disc engaged thereby, at full spool speed. Furthermore, at this stage, the fleeter drive is also actuated by the counter mechanism so as to discontinue its reciprocating movement aforesaid, and instead to continue to move to the left until the wire W passing between the fleet rolls 6 is axially inwardly adjacent to the right-hand flange of the left spool S. During this shifting of the fleet rolls 6, the wire W passes over the shift or cutover roll 23 (see FIG. 18 for example) so that, during the time that the fleet rolls 6 move across the space between the opposed flanges of the two spools S, the wire W continues to be wound on the full right spool S. Thereafter, when the fleet rolls 6 have reached the full line position of FIG. 18 ready to commence winding the wire W on the empty left spool S, the shift roll 23 is retracted, whereupon the wire W immediately is snagged by the aforesaid snagger discs and is cut as the wire W moves around past the cutter 24 disposed between said snagger discs. Thereafter, the fleet rolls 6 move axially back and forth between the flanges of the empty left spool S to progressively build up a coil of wire thereon. The foregoing is then repeated in the opposite direction when the lefthand spool has been filled to predetermined extent.

The drive motor 14 for the arbor 15 carrying the full spool S is braked and the arbor is swung to an inactive position for release and pushoff of the full spool S and for reload with the next empty spool S.

III. *The Arbor Asssembly (Figs. 1 to 6, and 15)*

Figure 5:
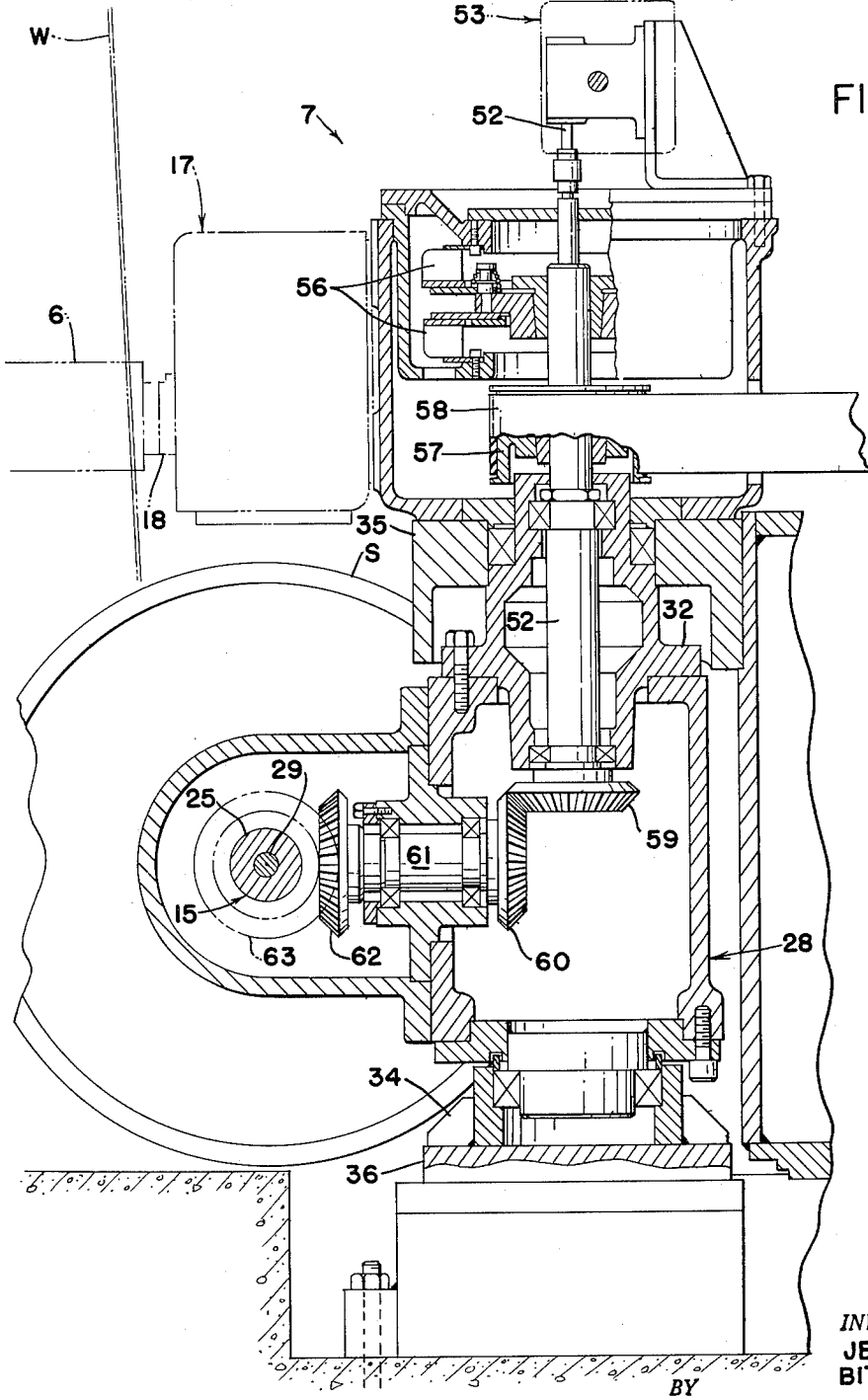
FIG. 5 is a further enlarged vertical cross-section view taken substantially along the line 5—5, FIG. 2.
Figure 6:
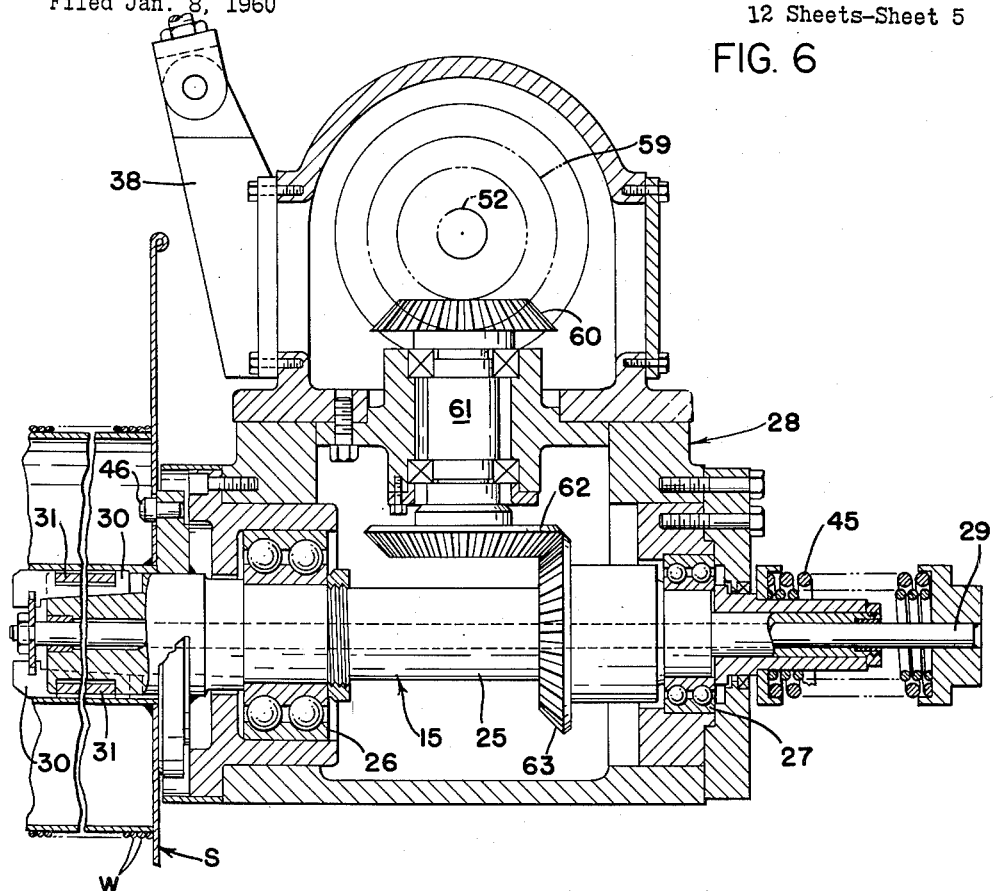
FIG. 6 is a fragmentary horizontal cross-section view taken substantially along the line 6—6, FIG. 2.

As shown in FIGS. 1 to 6, and 15, and especially FIG. 6, each arbor 15 comprises a tubular shaft 25 journalled as on double-row ball bearings 26 and 27 in an arbor housing assembly 28. The arbor 15 is itself of more or less conventional form including a spring-actuated draw rod 29, the head of which bears upon jaws 30 that are axially slidably keyed on the arbor shaft 25 and retained by split sleeve 31, and arranged to move radially outward when pulled axially inward whereby to frictionally grip the interior bore of the spool S.

Inasmuch as the components of the arbor assemblies 15 shown at the left and right of FIG. 2, for example, are identical, but assembled to be allochiral, it has been deemed sufficient herein to describe just one of them in detail.

Referring now to FIGS. 2, 5 and 6, the arbor housing 28 includes an upper part 32 and a lower part 34 which are journalled in brackets 35 and 36 on the base 12 for swinging movement of the arbor housing 28 about a vertical axis as by means of a pneumatic piston-cylinder assembly 17 (see FIG. 3) which has one end pivotally connected to the base 12, and the other end pivotally connected to the ear 38 of the arbor housing 28. Thus, it will be seen from FIG. 3 that when the left swing cylinder 37 is extended, the left arbor housing 28 will be swung in a clockwise direction to position its arbor 15 in forwardly projecting relation with respect to the base 12. By the same token, when the right swing cylinder 37 is extended, the right arbor housing 28 will be swung in a counterclockwise direction to position its arbor 15 to move the full spool S thereon to the dot-dash line position.

Mounted on the base 12 is a single acting arbor cylinder 40 which is effective, when extended, to move the draw rod 29 forwardly to actuate the jaws 30 to release the spool S. Then, upon actuation of the double acting pusher cylinder 41, also mounted on base 12, the full spool S is shoved off the arbor 15 by the pusher rod 42 to the lowermost dotted position as viewed in FIG. 3 and loaded into a truck or the like for removal from the device. Thereupon, the pusher rod 42 is retracted by springs 43 (cylinder 41 retracted) and an empty spool S may be loaded onto the arbor 15. When the right swing cylinder 37 is retracted, the right arbor 15 will be swung in a clockwise direction as viewed in FIG. 3 into axial alignment with the left arbor 15, and of course, the springs 45 acting on the draw rod 29 will be automatically effective to expand the jaws 30 into gripping engagement with the empty spool S. Preferably, the flange of the arbor shaft 25 is provided with a locating pin 46 (FIG. 6) which extends through a hole in the flange of the spool S, whereby the spool S gripped by the arbor 15 is keyed against rotary slipping.

The lower part 34 of the arbor housing 28 has an adjustable stop screw 47 as clearly shown in FIGS. 2, 14, and 15, which is adapted to engage an upstanding boss 48 on the base 12 to determine the position of the arbor 15 when swung out to inactive position. The lower part 34 aforesaid is also provided with an opening 49 into which a latch plunger 50 is adapted to be inserted as by means of the pneumatic latch cylinder 51 mounted in the base 12 to thereby releasably lock the arbor housing 28 in its active operating position. When it is desired to swing the arbor 15 outwardly for unloading a full spool S thereon and for reloading with an empty spool S, the latch cylinder 51 is actuated to move the plunger 50 downwardly out of the opening 49 in said lower part 34.

As best shown in FIGS. 2 and 5 the upper part 32 of the arbor housing 28 has journalled therein a vertical shaft 52 which, at its upper end, is coupled to a counter mechanism 53 and has associated therewith a brake assembly herein shown for example as an electromagnetic brake 56. There is also keyed onto the shaft 52 beneath the aforesaid brake 56, a pulley 57 over which is trained the drive belt 58 from the associated arbor drive motor 14. The lower end of the shaft 52 has keyed thereon a bevel gear 59, which bevel gear meshes with a bevel gear 60 on a jack shaft 61 journalled in the arbor housing 28 and having a bevel gear 62 on its other end meshing with a bevel gear 63 keyed on the arbor shaft 25 (see FIG. 6).

Accordingly, when the brake 56 associated with one arbor 15 is released under the control of the counter mechanism 53 of the other arbor 15, said one arbor will be driven at a speed corresponding to that of the full wound spool S, and, of course, when the brake 56 is subsequently applied, the arbor 15 with its full wound spool S thereon will be rather promptly stopped so that the arbor 15 may be swung out to inactive position for unloading of the full spool and reloading with the next empty spool, this being done while the winding proceeds on the other spool.

IV. *The Fleeter or Traverse Assembly (Figs. 1 to 4, and 7 to 11)*

As previously mentioned, the fleeter assembly includes a housing 17 mounted on the top of the base 12 and has associated therewith a relatively small electric drive motor 19 and a speed reducer-reversing mechanism 20. As shown schematically in FIG. 17, the speed reducer has two output shafts 64 and 65 with clutches 67 and 68, which through a fleeter drive sprocket 69 on shaft 64 and chain 70 connected to fleeter carriage 18 is operative to reciprocate the carriage 18 and its fleet rolls 6 axially relative to the spools S. The output shafts 64 and 65 are alternately driven by alternate engagement and disengagement of their clutches 67 and 68, the output shaft 65 having a gear 71 thereon in mesh with a gear 72 on the sprocket drive shaft 64. Also mounted on shaft 64 is a switch gear clutch 73 which drives gear 74 meshing with gear rack 75, said gear rack alternately tripping the reversing switches 76 and 78 that engage and disengage clutches 67 and 68. A stroke adjusting handwheel 79 when turned moves the switches 76 and 78 closer together or farther apart to change the stroke of carriage 18.

Now, with reference to the details of the fleeter as shown on FIGS. 7 to 11, the extension of the shaft 64 on which drive sprocket 69 is mounted is journalled in the fleeter housing 17, the chain 70 being trained and held in wrapped-around engagement by adjacent idler sprockets 80.

The fleeter carriage 18 is axially reciprocably guided on a shaft 81 which has its ends fixed in bosses 82 at the opposite ends of the fleeter housing 17. The ends of the chain 70 are connected by couplings 83 to the carriage 18 and intermediate portions pass over sprockets 84 journalled in housing 17 adjacent the ends thereof and thence pass under and over the idler and drive sprockets 80 and 69. Accordingly, by turning the shaft 64 in opposite directions, the carriage 18 is caused to reciprocate axially along the shaft 81.

Secured to the front wall of the fleeter housing 17 is a longitudinally extending track 85 which is parallel to the fleeter carriage shaft 81, the carriage being provided with an upstanding boss whereby both the shaft 81 and the bearing equipped stub shaft 86 fitted in the track 85, and the track 85, serve to guide the carriage 18 for reciprocatory movement.

Longitudinally adjustable on the carriage guide shaft 81 and adjacent each end thereof, is a block 87 carrying a reset switch 89, adapted to be actuated by the head of the screw 90 mounted at the corresponding end of the carriage 18. These reset switches 89 as later described in detail, serve to reactivate the corresponding reversing switches 76 and 78 and to engage switch gear clutch 73.

The carriage 18 has mounted on the posts 91 thereof a cam bar 92 (see FIGS. 9 and 11) which actuates shift switches 93 mounted on the track 85. The arrangement of reversing switches 76 and 78, reset switches 89, and shift switches is such that when wire is being wound on the left spool S as viewed in FIG. 17, the carriage 18 is reciprocated by alternate actuation of the reversing switches 76 and 78 by the rack 75. However, when the left spool S is fully wound, the left counter 53 energizes the drive motor 14 for the right empty spool S and accelerates it to full spool speed. The left counter 53 also deactivates the right reversing switch 78 and consequent disengagement of switch gear clutch 73, engagement of clutch 67, and disengagement of clutch 68. Accordingly, the carriage continues to move toward the right and when the cam bar 92 trips right shift switch 93, the solenoid air valve 94 is opened to admit air into the shift cylinder 95 to retract the shift roll 23 so that the wire W snaps across the snagger 16 and motor 14 for the right empty spool S is accelerated to empty spool speed to commence winding of that spool. The tripping of the right reset switch 89 by carriage 18 reactivates right reversing switch 78 and engages switch gear clutch 73. The winding of the right spool S continues until the right counter 53 shows a prescribed number of turns whereupon the carriage 18 is shifted to the left to wind the now empty spool S at the left by actuation of the left motor 14, the left reversing switch 76, left shift switch 93, and left reset switch 89.

The carriage 18 (see FIG. 9) has anchored therein a pair of forwardly horizontally projecting shafts 96 on which the fleet rolls 6 are journalled, said fleet rolls 6 being adjustable toward and away from each other to accommodate wires W of different sizes by reason of the eccentric dispositions of the roll supporting portions of said shafts 96 with respect to the anchored portions. The traverse rolls 6 are of such length as to permit the wire W to progressively travel axially from one end toward the other as the coil of wire W grows from minimum to maximum diameter.

Each reset switch-carrying block 87 aforesaid, is adjusted longitudinally of the carriage guide shaft 81 as by means of a screw 97 that has threaded engagement with the block 87, but which screw is rotatable and axially fixed in the corresponding boss 82 of the fleeter housing 17.

From the foregoing, it is evident that the above-described fleeter assembly is of simple and efficient form and may be readily adjusted to accommodate different sizes of spools S, the traverse rolls 6 thereof being reciprocable first between the flanges of one spool, then shifted across the space between the flanges of that spool and the other one, and finally, reciprocated back and forth between the flanges of such other spool. As hereinafter explained under the heading VI. The Spool-to-Spool Shift or Cutover Mechanism, the spool-to-spool shift or cutover roll 23 becomes effective, when the traverse rolls 6 shift from one spool to the other to snap the wire W across the snagger 16 for gripping and for cutting, whereupon the winding operation proceeds immediately on the empty spool S without excess wire whipping around and without danger of snarling of the wire.

V. *The Snagger Assembly* (FIGS. 2 and 12 to 14)

The snagger assembly 16 is disposed between the arbors 15 when the latter are in coaxially aligned operating position and comprises a forwardly extending bracket 100 on the base 12 of the machine to which a pair of snagger discs 101 are journalled by a pair of double row ball bearings 101A or the like. Each snagger disc 101 carries a spring-loaded friction drive plate 102 adapted to be engaged by the end of a spool S mounted on the associated arbor 15 whereby each snagger disc 101 is caused to rotate in unison with the arbor 15 and spool S.

Each snagger disc 101 has peripheral series of wire snagging fingers 103, herein twelve in number uniformly spaced around the periphery. As best shown in FIG. 12, each finger 103 comprises a generally T-shaped part 104 which is secured, as by screws, to the snagger disc 101. Between the radial legs 105 of part 104 is a bar 106 which is pressed by the spring 107 radially outward against the laterally extending portion of the T-shaped part 104. The two parts 104 and 106 of each finger are provided with beveled leading edges as shown, so that a wire W caught by the outer part 104 will be caused to slide along the non-radial cam surface 108 thereof into the crotch of the V defined by such beveled leading edges and will ultimately snap and be held between the parts 104 and 106.

Because there are so many of these fingers 103 on each snagger disc 101, the wire W will be grasped by one finger of one disc 101 within a small fraction of a revolution after snapping off the cut-over roll 23 and because the other disc is rotating at full spool speed, the wire will extend nearly transversely across the snagger discs 101 when grasped by a finger 103 of such other disc 101.

Mounted on the bracket 100 in a position midway between the snagger discs 101 and in the path of the wire W extending across the snagger fingers 103 is a wire cutter 24 mounted on the bracket 109. Thus, when the wire W is snagged by the fingers 103 of the two snagger discs 101, it is carried thereby past the cutter 24 which promptly cuts the wire W with one end of the wire being the finishing end of the wire on the full spool S, and with the other end being the starting end for the winding of the wire onto an empty spool S. After the wire W has been thus cut, the winding operation on the empty spool S is commenced and the rotation of the full spool S and the snagger disc 101 engaged thereby is stopped, whereupon the operator may pull out the starting and finishing ends of the wire W from the snagger fingers 103 of the adjacent disc 101, whereupon the arbor 15 with the full spool S thereon may be swung out to inactive position for unloading of the full spool and for reloading with the next empty spool.

As previously mentioned, the controls for the arbor drive motors 14 are such that at the time of cutover the empty and full spools are rotating at the same speed to maintain uniform tension in the wire, and thereafter the empty spool is accelerated to maintain a prescribed lineal speed of the wire.

VI. *The Spool-to-Spool Shift or Cutover Mechanism* (FIGS. 3, 4, and 16 to 18)

This mechanism comprises a separate housing 21 mounted in front of the snagger 16 and is formed with a downwardly and rearwardly sloping shelf 115 on which the shift or cutover roll housing 21 is adjustably mounted to accommodate different sizes of spools S, the fleet rolls 6 being of sufficient length as aforesaid to accommodate different sizes of spools. Projecting horizontally and rearwardly from the housing 21 is an adjustable guide bushing 116 for the piston rod 117 of the pneumatic shift cylinder 95, the shift roll 23 being journalled as by a double row ball bearing 118 on a guide sleeve 119, and the guide sleeve 119 of the shift roll 23, in turn, being secured on the end of the piston rod 117 by means of a screw as shown.

Referring to FIG. 18, for example, it can be seen that during the time the traverse rolls 6 are moved from the dotted line position to the full line position after having wound the spool S at the right, the winding on the full spool S continues by reason of the wire W passing over the shift roll 23 as shown. As evident, when the shift cylinder 95 is actuated to pull the shift roll 23 forwardly, that is, toward the left, as viewed in FIG. 16, the wire W under tension will immediately snap across the snagger discs 101 where it is snagged by the snagger fingers 103 and cut by the cutter 24, whereupon the wire snagged by a finger of left-hand snagger disk 101 of FIG. 18 will commense immediately to be wound on the empty spool S on the left. Conversely, when the left spool S is full, the traverse rolls 6 will shift from the solid line position to the dotted line position while the wire W passes over the shift roll 23 and continues to be wound on the full left-hand spool S. Again, the shift roll 23 is pulled forwardly of the machine to cause the wire W to snap across the snagger discs 101 and to be grasped and cut for continuing the winding operation on the right-hand empty spool S.

VII. *Automatic Control System* (FIGS. 17 to 19)

Referring first to the schematic diagram of FIG. 19, there is provided a control panel 125 with duplicate sets 126 of push button switches 127, 128, and 129 for "Swing Out," "Swing In," and "Spool Pushoff" of the respective arbors 15 through actuation of the solenoid air valves 130 for the double acting swing cylinders 37 and of the solenoid air valves 131 of the pushoff cylinders 41. The actuation of one of the "Swing Out" buttons 127 also at the same time energizes the associated solenoid air valve 132 for admitting air into the single acting arbor cylinder 40 and energizes the associated solenoid air valve 134 for the latch cylinder 51 whereby when the "Swing Out" push button 127 is closed, the locking plunger 50 is withdrawn from locking engagement with the arbor housing 28. Similarly, when the "Swing In" button 128 is actuated, the solenoid air valve 134 will be energized to cause the locking plunger 50 to pop into the hole 49 of the arbor housing 28 and thus to lock the latter in operating position.

The control panel 125 and associated control box (not shown) may be mounted on the top of cutover housing 21 for ease of manipulation.

The control panel 125 is also provided with duplicate start-stop switches for the respective arbor drive motors 14.

Mounted at the center of the control panel 125 is a cluster 140 of push button switches for controlling the traverse drive motor 19 including lay adjustment, fleeter-run, fleeter selector, fleeter positioning, fleeter stop, and fleeter jog.

At the left of FIG. 19 is shown the schematic diagram of the festoon unit 4, switch 160 being actuated by cam 161 to throw either spool motor 14 into maximum acceleration as soon as enough slack wire has been accumulated to move the reactor 162 out of control range. The reactor 162 is operated by cam 163 and is effective to synchronize the spool motor speed with the speed of the drawing machine 1. The festoon unit 4 is also provided with a pressure regulator 164 and a manually operated valve 165, the regulator 164 being operative to control the air pressure to the festoon cylinder 167 and thus control the tension on the wire W as it travels to the spool S and the manual valve 165 being operated to manually position the movable sheaves 11 (see FIG. 1) on cylinder 167 at start up of the machine in case they be too light in weight or too low in position. Also associated with the festoon unit 4 is a shock arm cylinder 168 with a pressure regulator 169 and manual valve 170, the cylinder 168 acting on the shock arm or auxiliary tension arm 171 (see FIG. 1) to cushion tension variations in the wire W and to take up shock during wire transfer from one spool S to the other spool S. The remaining parts 172 and 173 of the festoon unit 4 are the line jog switch and wire break switch respectively. Such wire break switches 173 are also employed between the drawing machine 1 and annealer 2 and between the quench unit 3 and festoon unit 4 in addition to the one shown in FIG. 19 between the festoon unit 4 and spooler 7 effective to deenergize the continuous spooling operation whenever the wire W breaks.

In FIG. 19, at the upper portion thereof, the units X and Y labeled "C30–VS" are the individual motor-generator sets controlling the spool motors 14 and the unit Z labeled "VS–JR" is a rectifier set to control the speed of the fleeter motor 19.

VIII. Operation (FIGS. 1 and 17 to 19)

Referring now to the aforesaid FIGS. 1 and 17 to 19, and assuming that the machine has been strung up as shown in FIG. 1, that the winding stroke of the fleet rolls 6 has been adjusted by handwheel 79, that the reset switches 89 have been adjusted by shifting blocks 87, and that the lay adjustment of the fleeter or traverse mechanism has been made by adjusting the speed of the fleeter motor 19 in relation to the arbor motors 14, the dual take-up device herein is set in operation energizing the arbor motors 14 (closing the start-stop, slack take-up switches 141 and 142) and energizing the fleeter motor 19 (closing the appropriate "Fleet Run" switch in the cluster 140). Thus, if the fleet rolls are in the position shown in FIG. 1, the spool arbor drive motor 14 for the right-hand spool S will drive the right-hand spool arbor 15 and the fleeter drive motor 19 will cause the fleet roll carriage to reciprocate back and forth between the flanges of the right-hand spool S.

As examples, wires of size No. 10 A.S.W. and smaller, may have lineal speeds exceeding 6,000 ft./min.; of sizes Nos. 8 and 9 usually will have lineal speeds in the vicinity of 4600 ft./min.; of sizes Nos. 6 and 7 will have speeds of about 2360 ft./min.; and the heavier wire sizes such as Nos. 4 and 5, may have lineal speeds of about 1500 ft./min. Therefore, with a winding speed of 6,000 ft./min., the arbor 15, for a spool S of 11″ barrel diameter, would have a speed of about 34.6 revolutions per second, while the fleet rolls 6 would travel at the rate of 47.3 strokes/min. when the winding stroke is 11″ long and a ¼″ lay.

Continuing with the operation, the traverse rolls 6 will reciprocate back and forth between the flanges of the right-hand spool S and during that time the right-hand counter 53 is being driven to record the number of turns of wire W wound onto that spool. Such reciprocation is under the control of the reversing mechanism as best shown in FIG. 17, in which the clutches 67 and 68 are alternately engaged and disengaged by the operation of the reversing switches 76 and 78.

Now, when the right-hand counter 53 reaches a preset figure, it starts and accelerates to full spool speed the drive motor 14 for the left-hand arbor 15 and at the same time deactivates the left reversing switch 76, whereby the traverse roll carriage movement toward the left, as viewed in FIGURE 18, for example, continues to the solid line position whereat the wire W between the traverse rolls 6 is aligned with the right-hand flange of the left spool S but the wire W continues to be wound on the full right-hand spool S by reason of the wire W passing over the shift roll 23. Accordingly, a number of turns of the wire W are wound onto the full spool during the time that the traverse rolls 6 move from the dotted line position to the full line position of FIG. 18.

When the fleeter or traverse rolls 6 reach the full line position of FIG. 18, the cam bar 92 on carriage 18 trips the left shift switch 93 to energize the solenoid air valve 94 for retracting the shift cylinder 95, thereby withdrawing the shift roll 23 to wire disengaging position. At that time, the tension in the wire W causes it to snap it across the snagger discs 101, the fingers 103 of which grasp the wire W and promptly move it past the cutter 24 to cut the wire to provide a finishing end for the full spool and a starting end for the empty spool. The tripping of the shift switch 93 also accelerates the motor 14 for the left arbor 15 to empty spool speed.

The fleet rolls 6 now commence the winding on the empty spool with the left reset switch 89 being tripped to reactivate left reversing switch 76 and consequent engagement of switch gear clutch 73. The right counter 53 also controls the brake 56 for the right arbor to stop rotation of the full spool S.

The operator of the machine may now push the right swing-out button 127 which swings the right-hand arbor 15 with the full spool thereon by actuation of the right swing cylinder 37 in the manner previously described, and the arbor cylinder 40 is actuated to release the arbor 15 from the full spool S at the time that the arbor 15 reaches the out position. Such actuation of the swing-out button 127 also pulls out the locking plunger 50 by actuating the latch cylinder 51 so that the arbor 15 is released for swing-out movement.

After the arbor 15 has reached the swing-out position, the operator pushes the right-hand push-off button 129 to actuate the push-off cylinder 41 whereby the full spool S is pushed off the arbor 15 into a suitable truck or container for transport away from the spooler. The next empty spool S is then loaded onto the arbor 15 with its flange opening in register with the locating pin 46, and by pushing in the right swing-in button 128, the swing cylinder 37 is actuated as is the arbor cylinder 40, and also the latch cylinder 51, whereupon the empty spool S is gripped by the arbor 15, the arbor 15 is swung in and locked in operating position with the end of the spool engaging the friction drive ring 102 of the snagger disc 101 which assists in the supporting of the spool and arbor 15 against deflection at the free end of the arbor as the coil of wire on the spool grows in diameter and increases in weight.

During all of that time of unloading the right full spool and reloading with an empty spool, the left-hand spool S is being wound and when it is full, its counter-mechanism 53 automatically operates to accelerate the right-hand spool arbor drive motor 14 and operates the various clutches and controls in the manner aforesaid, so that the fleet roll carriage 18, as it moves to the right to the solid line position of FIG. 18, is no longer reversed but instead, continues to move to the right to the dotted line position; and again, the shift roll 23 being in operating position, causes the wire W to be continued to be wound onto the left-hand, and now full, spool S. When the fleeter carriage 18 reaches the dotted-line position ready for commencing the winding of wire onto the empty spool S at the right, the shift roll 23 is retracted to snap the wire W across the snagger assembly to grasp the finishing and starting ends and to cut the wire W as previously explained.

The foregoing operations are then repeated for unloading the full spool S on the left arbor 15 and reloading with an empty spool S while the right spool S is continuously wound.

Other modes of applying the principle of the invention may be employed, change being made as regards the details described, provided the features stated in any of the following claims, or the equivalent of such, be employed.

I therefore particularly point out and distinctly claim as my invention:

1. A wire take-up device comprising a pair of coaxial arbors on which spools are adapted to be supported in axially spaced apart relation; drive means for rotating said arbors and the spools thereon; an axially reciprocable traverse assembly and control means operative to reciprocate said assembly to form coils of wire on the respective spools; wire transfer roll means disposed in the path of the wire as said assembly moves from one spool to the other to continue the winding operation on one said spool; support means supporting said wire transfer means for axial movement out of the path of the wire to commence winding of a coil on the other said spool; a wire snagger assembly between said arbors and the spools thereon including discs journalled in fixed bearings and constituting supports for the free ends of said arbors, each disc including a spring loaded friction drive plate adapted to be engaged and driven by the respective spools, fingers on said discs to grasp the wire as it snaps across the space between said arbors; a wire cutter between said discs disposed to sever the wire thus grasped by said fingers; and arbor mounts each supported for movement with respect to its drive means away from said snagger assembly whereby a full spool on one arbor may be removed therefrom and replaced by an empty spool during the time that wire is wound on the spool on the other arbor.

2. The device of claim 1 wherein control means are provided for said drive means effective, upon predetermined filling of the spool on one arbor, sequentially to energize the drive means for the other arbor to substantially the same speed as the drive means for said one arbor for snagging and cutting of the wire, to accelerate the drive means for said other arbor to empty spool speed, and to deenergize the drive means for said one arbor for removal of the spool therefrom when moved away from said snagger assembly.

3. The device of claim 1 wherein said arbor mounts are arranged for swinging movement about axes angularly related to the axes of rotation of the respective arbors.

4. The device of claim 1 wherein spool pushoff means are associated with the respective arbors effective to push a full spool from an arbor thus moved away from said snagger assembly.

5. The device of claim 1 wherein said traverse assembly comprises a pair of rolls between which the wire is guided for winding on the respective spools.

6. The device of claim 1 wherein said arbors are expansible and contractible to grip and release the spools thereon, and wherein means are provided to contract said arbors for removal of full spools therefrom and for reloading of empty spools thereonto when the respective arbor mounts are moved as aforesaid.

7. The device of claim 1 wherein said arbors are expansible and contractible to grip and release the spools thereon, and wherein means are provided to contract said arbors for removal of full spools therefrom and for reloading of empty spools thereonto when the respective arbor mounts are moved as aforesaid, and wherein means are provided to expand said arbors for gripping empty spools thereon preparatory to movement of the respective arbor mounts toward said snagger assembly.

8. The device of claim 1 wherein each disc has a circular series of snagger fingers, each finger comprising a hook-like member including a radially extending portion and a circumferentially extending portion, and a spring-actuated member which is urged radially toward said circumferentially extending portion to grasp the wire therebetween.

9. The device of claim 1 wherein said arbors have horizontally disposed axes, and wherein said arbor mounts are arranged for swinging of said arbors in opposite directions about vertical axes.

10. The device of claim 1 wherein said traverse assembly comprises a carriage on which a pair of rolls is journalled for passage of the wire between said rolls, and wherein said carriage is axially reciprocated by a flexible element having its ends connected to said carriage.

11. The device of claim 1 wherein said wire transfer roll means comprises a roll over which the wire passes for winding on one spool as said traverse assembly shifts to wind the wire on the other spool, said roll being of diameter to so guide the wire for winding on the other spool as said traverse assembly shifts to wind wire on said one spool.

12. The device of claim 11 wherein means are provided to adjust said wire transfer roll generally radially toward and away from the common axis of said arbors so as to be disposed in the path of the wire regardless of the diameter of the coils wound on different sizes of spools.

13. In a dual takeup device of the type in which wire is coiled on one of a pair of coaxial spools mounted on power driven arbors and then on the other, the combination of a wire snagger and cutter assembly disposed between said arbors; said assembly comprising a pair of discs frictionally driven by the respective arbors and mounted on fixed bearings, each disc being provided with snagging fingers that grasp the wire as it is transferred from a full spool on one arbor to an empty spool on the other arbor, and a cutter disposed between said discs to sever the wire thus grasped by the fingers of the respective discs whereby the full spool and said one arbor may be disengaged from the associated disc for replacement by an empty spool while a coil is wound on the spool on the other arbor.

14. The device of claim 13 wherein said fingers each comprises a hook-like member extending radially and thence circumferentially, and a spring actuated member extending radially toward the circumferentially extending portion of said hook-like member, the wire being grasped between said members.

15. In a dual take-up device of the type in which wire is coiled on one of a pair of coaxial spools mounted on power driven arbors and then on the other, the combination of a movable wire transfer roll disposed between the spools which, in active position, guides the wire thereover for continued winding on one spool and which, in inactive position, is withdrawn from the path of the wire to permit the wire to snap across the spools to commence winding on the other spool, an adjustable guide bushing, said roll being slidably mounted on said adjustable guide bushing, and piston-cylinder means extending through said guide bushing thus to move said roll.

16. The device of claim 15 including a guide sleeve slidably mounted on said guide bushing, and bearing means mounting said roll on said guide sleeve.

17. The device of claim 13 including spring loaded friction drive plates on each disc adapted to be engaged and driven by the respective spools.

18. In a continuous dual takeup device, the combination of a base; a pair of variable speed motors mounted on said base; a pair of coaxial horizontal arbors having adjacent free ends axially spaced apart and each adapted to receive a spool on such free end; a pair of arbor supports on said base providing for swinging of said arbors about upright pivots to positions whereat full spools may be axially removed from the free ends thereof and replaced by empty spools, power transmission means extending from said motors through said supports to the respective arbors for driving the latter; a traverse assembly and drive means therefor on said base operative to axially reciprocate said assembly first to wind a coil of wire on the spool on one arbor and then to wind a coil of wire on the spool on the other arbor; wire transfer means and actuating means therefor operative to guide the wire onto one spool as said assembly is moved to a position to wind a coil on the other spool and further operative, when withdrawn out of the path of the wire, to permit the wire to snap across the space between said spools for commencing the winding operation on said other spool; a wire snagger and cutter mechanism disposed between said spools and arbors operative to grasp the wire at spaced apart points as it is thus snapped across said spools and to cut the wire between such spaced points; and motor control means operative to deenergize the motor for that one of the arbors that has wound on the spool thereof a coil of predetermined size whereby said arbor may be swung to replace the full spool with an empty spool while the motor for the other arbor remains energized to continue the winding operation on the spool thereof.

19. The device of claim 18 wherein said one arbor with an empty spool therein, when returned to coaxially aligned position with respect to the other arbor and upon buildup of a coil of predetermined size on the spool on said other arbor is accelerated to full spool speed through said control means and motor to facilitate snagging, transferring, and cutting of the wire.

20. The device of claim 18 wherein said wire snagger and cutter assembly comprises a pair of discs journalled on said base and arranged to be driven by the respective arbors, to support the free ends of the latter, and to grasp the wire as aforesaid, and a cutter fixed with respect to said base and disposed in the path of the wire grasped by said discs.

21. The device of claim 18 wherein said wire transfer means and actuating means therefor comprises a roll over which the wire passes as said fleeter assembly moves to a position to commence winding of the other spool after having wound one spool, said roll being withdrawn by said actuating means to permit the wire to snap across said spools and across said snagger and cutter assembly.

References Cited in the file of this patent
UNITED STATES PATENTS

| | | |
|---|---|---|
| 1,956,906 | Mikaelson | May 1, 1934 |
| 2,424,021 | Cook | July 15, 1947 |
| 2,705,111 | Bruestle | Mar. 29, 1955 |
| 2,779,545 | Hauck et al. | Jan. 29, 1957 |
| 2,870,972 | Mason et al. | Jan. 27, 1959 |
| 2,932,462 | Nelson | Apr. 12, 1960 |
| 2,961,175 | Detrick et al. | Nov. 22, 1960 |